(12) United States Patent
Yoshizaki

(10) Patent No.: US 9,151,908 B2
(45) Date of Patent: Oct. 6, 2015

(54) LC TYPE PLUG WITH A SHUTTER HAVING A SPRING STORED IN BOTH A FRONT HOUSING AND A LOCKING HOUSING

(71) Applicant: HONDA TSUSHIN KOGYO CO., LTD., Tokyo (JP)

(72) Inventor: Tsuyoshi Yoshizaki, Tokyo (JP)

(73) Assignee: HONDA TSUSHIN KOGYO CO., LTD., Tokyo (JP)

( * ) Notice: Subject to any disclaimer, the term of this patent is extended or adjusted under 35 U.S.C. 154(b) by 0 days.

(21) Appl. No.: 14/333,783

(22) Filed: Jul. 17, 2014

(65) Prior Publication Data

US 2015/0050002 A1 Feb. 19, 2015

(30) Foreign Application Priority Data

Aug. 19, 2013 (JP) .................................. 2013-169544

(51) Int. Cl.
*G02B 6/38* (2006.01)
(52) U.S. Cl.
CPC ............ *G02B 6/3893* (2013.01); *G02B 6/3825* (2013.01); *G02B 6/3849* (2013.01)
(58) Field of Classification Search
CPC .. G02B 6/3869; G02B 6/3849; G02B 6/3825; G02B 6/381

USPC .......................................................... 385/139
See application file for complete search history.

(56) References Cited

U.S. PATENT DOCUMENTS

| | | | |
|---|---|---|---|
| 2003/0215191 A1* | 11/2003 | Taira et al. ........................ | 385/78 |
| 2010/0272396 A1* | 10/2010 | Komaki et al. ................... | 385/60 |
| 2013/0315541 A1* | 11/2013 | Nhep et al. ....................... | 385/80 |
| 2014/0082913 A1* | 3/2014 | Marcouiller et al. ........ | 29/426.1 |

FOREIGN PATENT DOCUMENTS

JP 2011-013606 * 1/2011

* cited by examiner

*Primary Examiner* — Akm Enayet Ullah
(74) *Attorney, Agent, or Firm* — Wenderoth, Lind & Ponack, L.L.P.

(57) ABSTRACT

An LC type plug with a shutter includes: a plug frame; a square cylindrical front housing arranged slidably on the plug frame and including a shutter; a locking housing connected to the plug frame; and a spring provided between an upper part of the front housing and the locking housing. The front housing includes a front portion storage space for storing a front portion of the spring, the locking housing is provided with a rear portion storage space for storing a rear portion of the spring, a rear end side of the front portion storage space and a front end side of the rear portion storage space are formed so as to overlap with each other, and the spring is not exposed to an outside even in a non-connected state of the plug, and the entire part is stored in the both storage spaces.

9 Claims, 10 Drawing Sheets

Fig. 8A
Fig. 8B
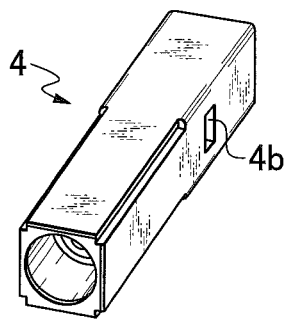
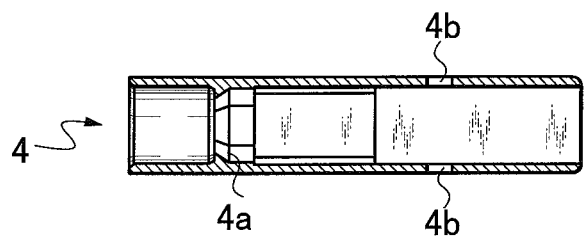
Fig. 8C
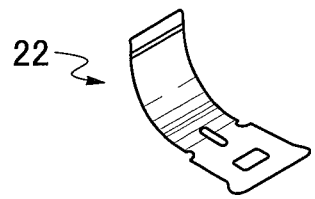
Fig. 8D
Fig. 8E
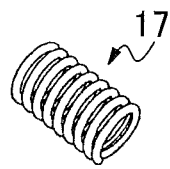
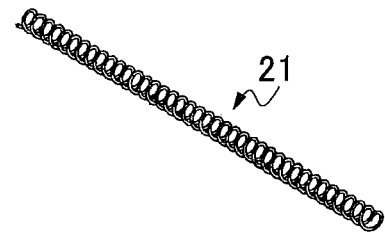

LC TYPE PLUG WITH A SHUTTER HAVING A SPRING STORED IN BOTH A FRONT HOUSING AND A LOCKING HOUSING

BACKGROUND OF THE INVENTION

1. Field of the Invention

The present invention relates to an LC type plug with a shutter used for a connecting end of an optical fiber cable.

2. Prior Art

In the prior art, as a known LC type plug, there is an LC type plug 15 including a cylindrical plug frame 18 having a ferrule 16 and a spring 17 configured to bias the ferrule 16 forward in the interior thereof; a cylindrical front housing (movable) 19 surrounding an outside of the plug frame 18 in sliding contact therewith; an elongated spring 21 obtaining a reaction force from a locking housing 20 so as to always bias the front housing (movable) 19 forward; a light-shielding plate (shutter) 22 having a curved shape, fixed at one end portion thereof to a front inner wall of the front housing 19, and configured to block light at a position in front of the ferrule 16; and the locking housing 20 configured to be fitted from the rear of the plug frame 18 as illustrated in FIG. 9A to FIG. 13.

In the LC type plug 15, the front housing 19 is biased forward by the spring 21 in a non-connected state so that the light-shielding plate 22 fixed to the front housing 19 protects eyes or the like by blocking laser beams from the ferrule 16, and the light-shielding plate 22 comes into abutment with an opening of the plug frame 18 by the retracted front housing 19 against a biasing force of the spring 21 in a connected state to extend the light-shielding plate 22 from the curved shape to a straight shape. Accordingly, the ferrule 16 protrudes from an opening end portion of the front housing 19 moved rearward, and the ferrule 16 on the LC type plug 15 side and a ferrule of an LC type adapter 24 as a connection counterpart (see FIGS. 2A and 2B) are connected (see JP-A-2011-13606).

However, in the LC type plug 15 with a shutter of the prior art, part of the elongated spring 21 that biases the front housing 19 always forward is exposed to the outside except for both end portions thereof as illustrated in FIG. 12. Therefore, there are probabilities of breakage during operation and corrosion after a long time of use. In addition, there is a problem that the number of components is increased and the number of assembly steps is also increased due to the usage of a pin 21a for preventing buckling of the elongated spring 21. The LC type plug with a shutter of the invention is proposed for solving the above-described problems.

SUMMARY OF THE INVENTION

In order to solve the above-described problem, an LC type plug with a shutter of the invention is an LC type plug to be fitted into an LC type adapter, including: a plug frame configured to retain a ferrule, a square cylindrical front housing arranged so as to be slidable on the plug frame and including a shutter configured to open and close in association with a movement of the ferrule at a distal end side opening, a locking housing fixedly and integrally connected to the plug frame configured to be fitted into and be locked with the LC type adapter, and a spring provided between an upper part of the front housing and the locking housing configured to bias the front housing forward, wherein the front housing is provided with a front portion storage space configured to store a front portion of the spring, the locking housing is provided with a rear portion storage space configured to store a rear portion of the spring, a rear end side of the front portion storage space and a front end side of the rear portion storage space are formed so as to overlap with each other, and the spring is not exposed to an outside even in a non-connected state of the plug, and the entire part is stored in the both storage spaces.

Inner diameters of the both storage spaces are preferably diameters close to an outer diameter of the spring that does not buckle even though the spring stored therein does not have a buckling preventing pin.

According to the LC type plug with a shutter of the invention, the spring configured to bias the front housing forward is stored in the storage spaces of the front housing and the locking housing so as not to be exposed to the outside. Therefore, no breakage occurs during operation, and a probability of corrosion is avoided. In addition, there is an advantageous effect that a buckling preventing guide pin is no longer necessary, so that the number of components is reduced and hence costs for manufacture and assembly are also reduced.

BRIEF DESCRIPTION OF THE DRAWINGS

FIGS. 8A and 8B are a perspective view viewed from the front and a cross-sectional side view of a plug frame of an LC type plug 1 with a shutter, respectively;

FIG. 8C is a perspective view of a shutter;

FIG. 8D is a perspective view of a ferrule biasing spring;

FIG. 8E is a perspective view of a front housing biasing spring;

DETAILED DESCRIPTION OF THE PREFERRED EMBODIMENTS

Figure 1A:
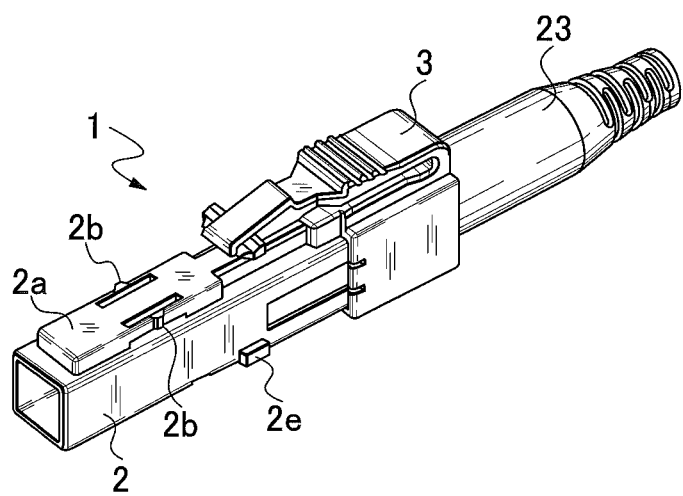
FIG. 1A is a perspective view of an LC type plug with a shutter of the invention illustrating a non-connected state.
Figure 1B:
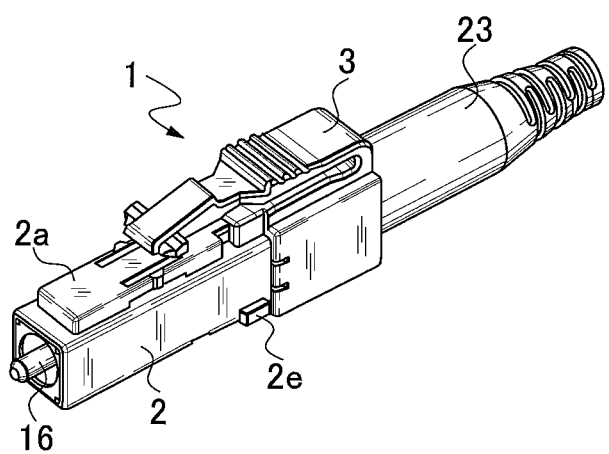
FIG. 1B is a perspective view of the LC type plug with a shutter illustrating a connected state.
Figure 4:
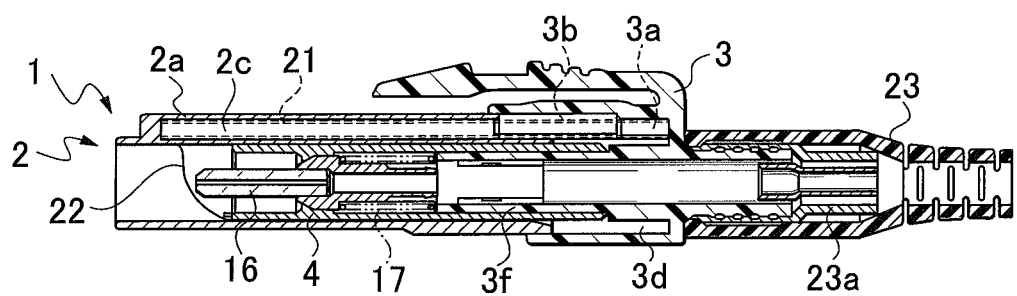
FIG. 4 is a cross-sectional side view illustrating the LC type plug with a shutter in the non-connected state.

An LC type plug 1 with a shutter of the invention is characterized in that an entire part of a front housing biasing spring 21 is hidden in a storage space 2c of a front housing 2 and a storage space 3a of a locking housing 3 and is not exposed to an outside as illustrated in FIGS. 1A and 1B, and 4.

Example 1

Figure 2A:
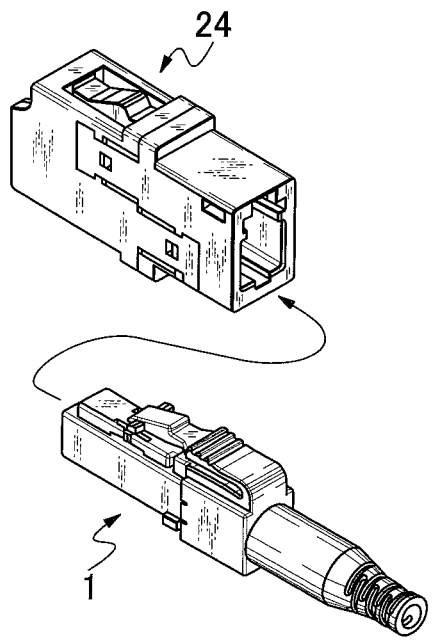
FIG. 2A is a perspective view illustrating a state before connection and fitting between the LC type plug with a shutter and an LC type adapter.
Figure 2B:
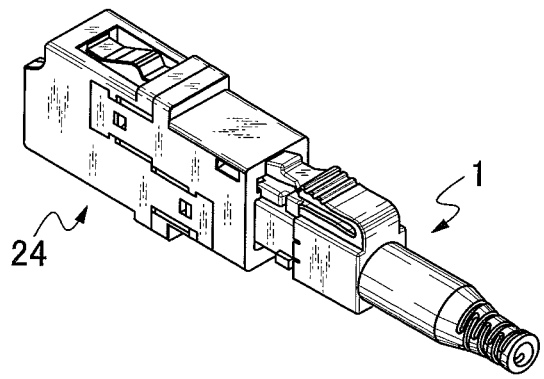
FIG. 2B is a perspective view illustrating a state after the connection and fitting therebetween.
Figure 3B:
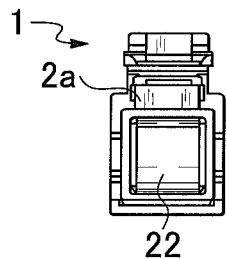
FIGS. 3A, 3B, 3C, 3D, and 3E are a plan view, a front view, a side view, a rear view, and a bottom view of the LC type plug with a shutter, respectively.
Figure 3D:
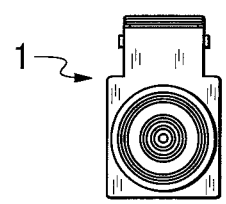
Figure 3A:
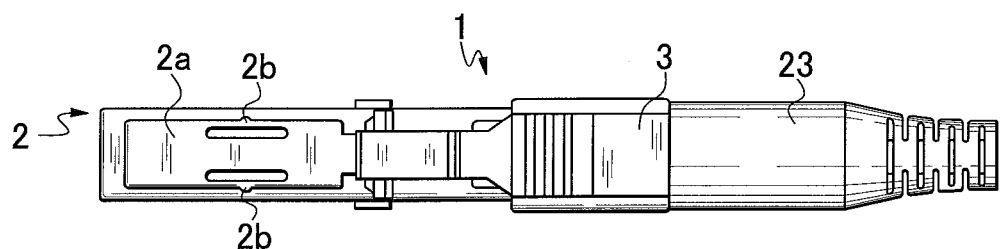
Figure 3C:
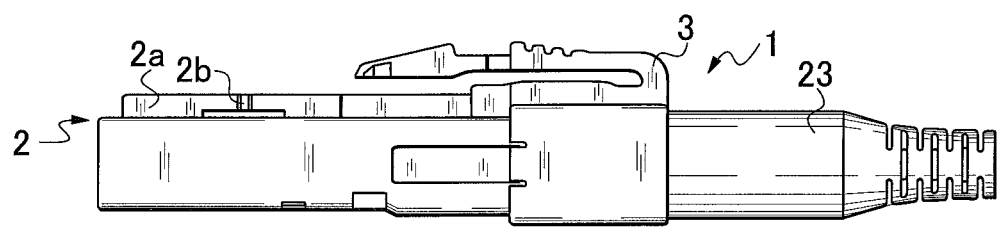
Figure 3E:
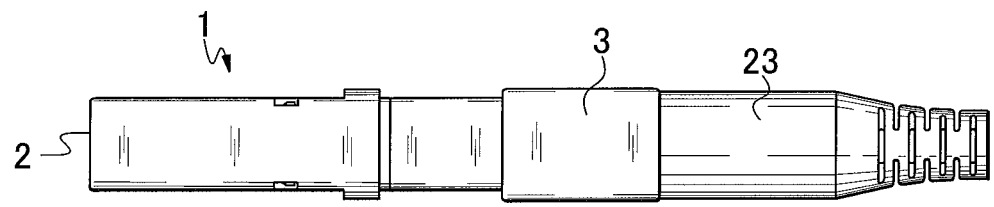

The LC type plug 1 with a shutter of the invention is fitted into an LC type adapter 24 as a connection counterpart as illustrated in FIGS. 2A and 2B. As illustrated in FIGS. 2A, 2B, 3A to 3E, and 4, projecting portions 2b of the front housing 2 abut against edge portions of an opening of the LC type adapter 24 when fitted into the LC type adapter 24, the front housing 2 having the projecting portions 2b formed integrally on an outer peripheral portion is moved rearward against a biasing force of the spring 21.

Figure 5:
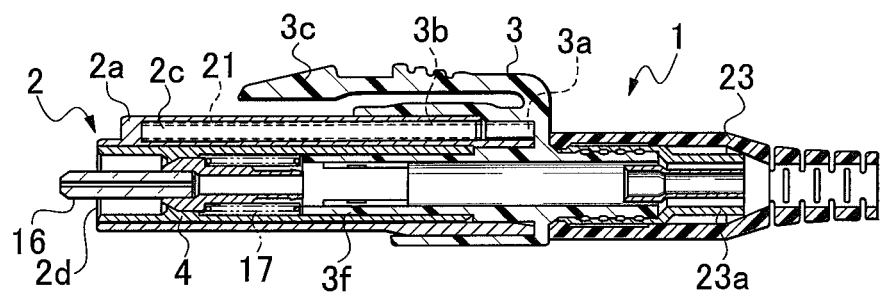
FIG. 5 is a cross-sectional side view illustrating the LC type plug with a shutter in the connected state.

Accordingly, as illustrated in FIG. 5, a distal end portion of a ferrule 16 included in the plug frame 4 which supports the front housing 2 inside so as to be movable projects outward from an opening 2d of the front housing 2.

The LC type plug 1 with a shutter includes the spring 21 that obtains a reaction force from a wall surface of the storage space 3a of the locking housing 3 so as to bias the front housing 2 always forward.

As illustrated in FIGS. 4, 6B, 6F, and 7F, the storage space 2c configured to store a front portion of the spring 21 provided in the front housing 2 and the storage space 3a configured to store a rear portion of the spring 21 provided in the locking housing 3 are provided so as to overlap with each other on the joined sides thereof in a non-connected state.

When the spring 21 is stored in the both storage spaces 2c and 3a, the spring 21 is stored so as not to be exposed to the outside even when the LC type plug 1 is in the non-connected state.

Respective components will be described. The front housing 2 is a square cylindrical body as illustrated in FIGS. 6A to 6F, and is inserted into the LC type adapter 24 from the front of the front housing 2. The opening on the rear side is mounted so as to cover the outside of the plug frame 4, which is fitted into a fitting portion 3f of the locking housing 3, and the front housing 2 is supported by the plug frame 4 so as to be slidable as illustrated in FIG. 4 and FIG. 5.

A guide portion 2a which serves as a positioning member at the time of fitting is formed on an upper part of the front housing 2, and the projecting portions 2b are formed on both side walls thereof. When the projecting portions 2b abut against the opening edge portion of the LC type adapter 24, the front housing 2 is moved rearward. Positioning projections 2e that serve as positioning members for rearward movement of the front housing 2 are provided on lower parts of side surfaces of the cylindrical body of the front housing 2.

Figure 6A:
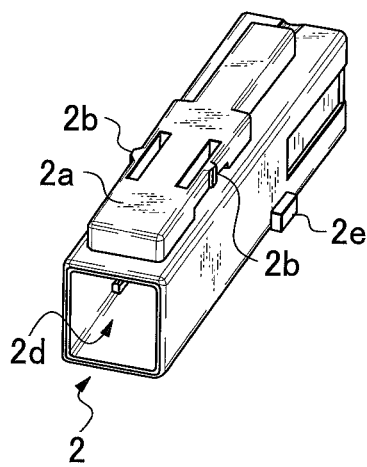
FIGS. 6A, 6B, 6C, 6D, 6E, and 6F are a perspective view viewed from the front, a perspective view viewed from the rear, a front view, a rear view, a side view, a cross-sectional side view of a front housing of the LC type plug with a shutter, respectively.
Figure 6B:
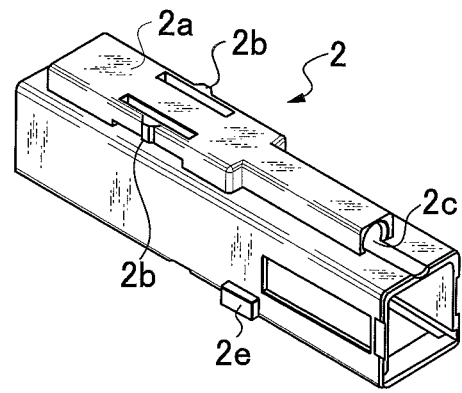
Figure 6C:
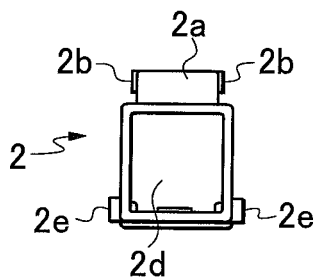
Figure 6D:
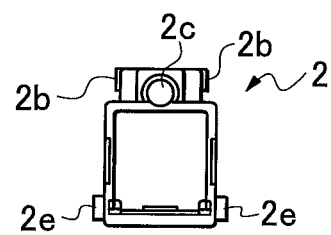
Figure 6E:
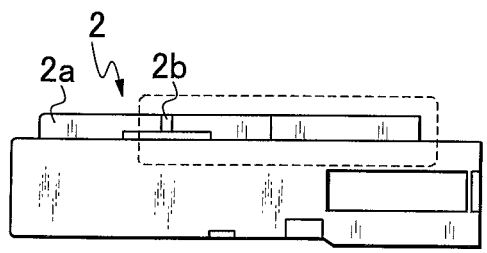
Figure 6F:
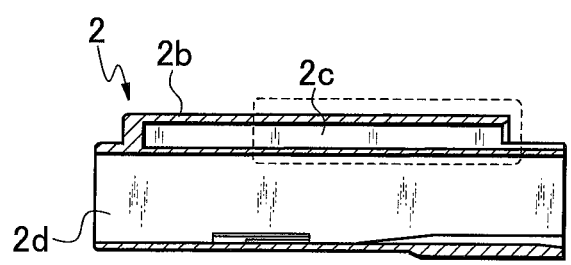
Figure 7A:
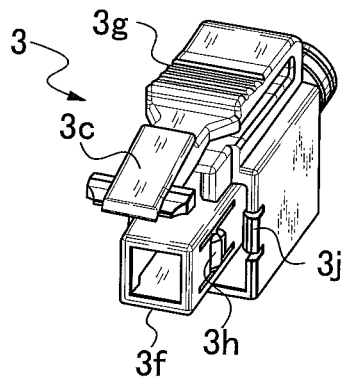
FIGS. 7A, 7B, 7C, 7D, 7E, and 7F are a perspective view viewed from the front, a perspective view viewed from the rear, a front view, a side view, a rear view, a cross-sectional side view of a locking housing of the LC type plug with a shutter, respectively.
Figure 7B:
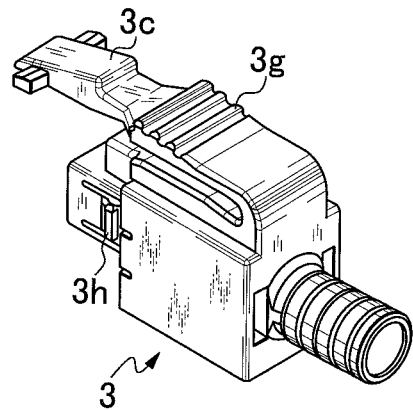
Figure 7C:
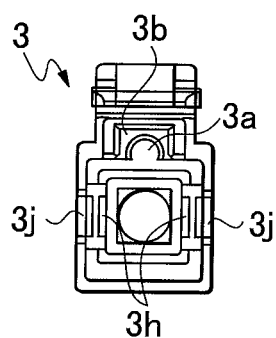
Figure 7D:
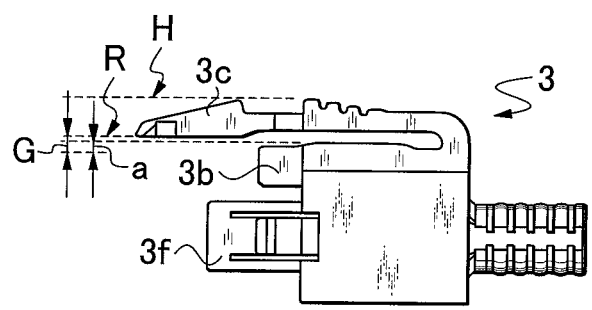
Figure 7E:
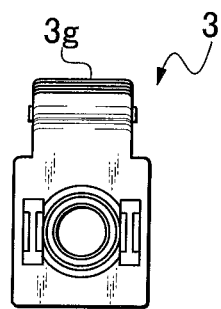
Figure 7F:
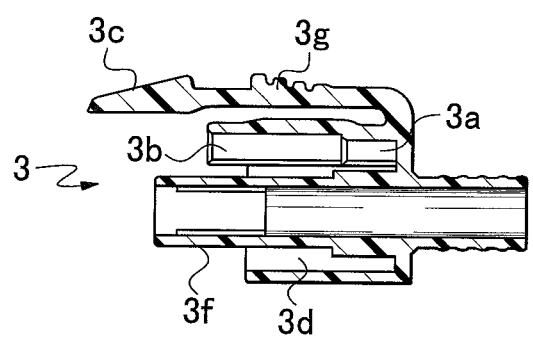
Figure 9A:
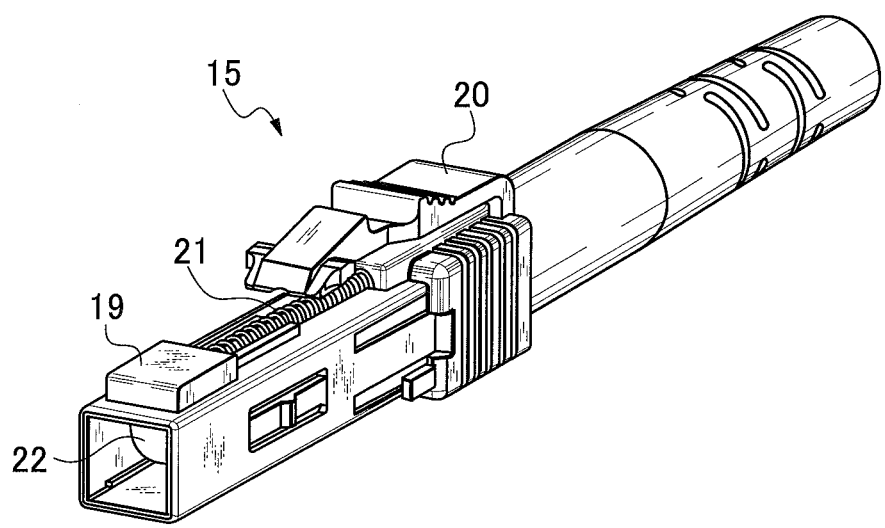
FIGS. 9A and 9B are a perspective view viewed from the front and a perspective view viewed from the rear of an LC type plug with a shutter of the prior art, respectively.
Figure 9B:
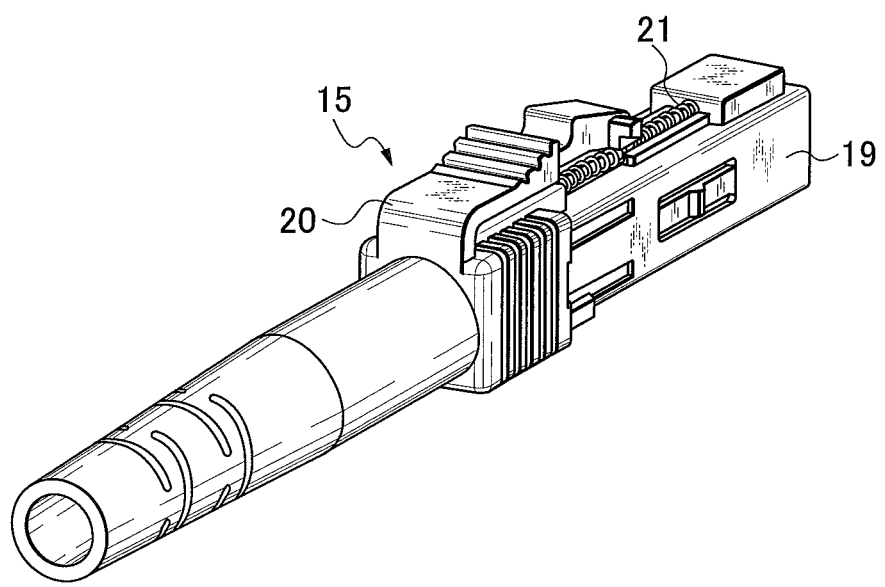
Figure 10A:
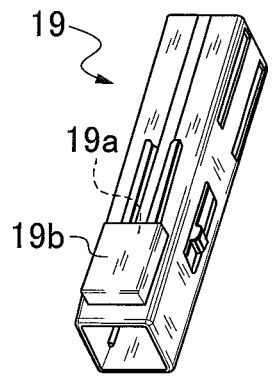
FIGS. 10A, 10B, 10C, 10D, 10E, and 10F are a perspective view, a plan view, a front view, a side view, a rear view, and a cross-sectional side view of a front housing of the LC type plug with a shutter, respectively.
Figure 10B:
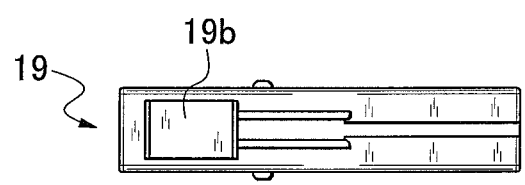
Figure 10C:
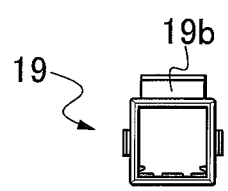
Figure 10D:
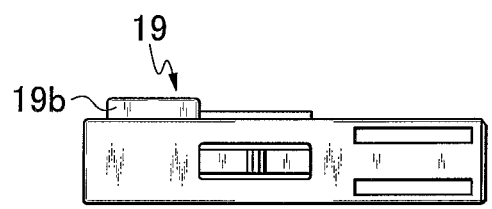
Figure 10E:
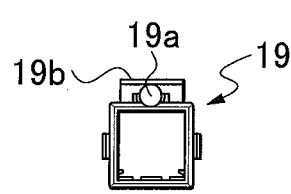
Figure 10F:
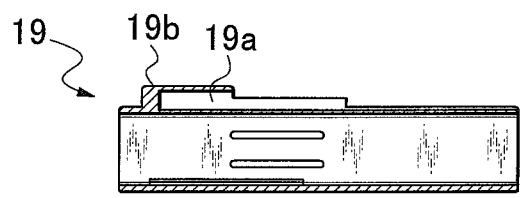

The guide portion 2a extends rearward as illustrated in FIGS. 6E and 6F, and includes the storage space 2c in the interior thereof for storing the spring 21. When comparing these structures with a front housing 19 of the prior art as illustrated in FIGS. 10D and 10F, a guide portion 19a of the prior art extends shortly toward the rear, while the guide portion 2a of the front housing 2 of the invention extends long toward the rear. Therefore, in the prior art, only a front end portion of the spring 21 is stored in a storage space 19a of a guide portion 19b, and other portion is exposed to the outside.

The locking housing 3 includes the storage space 3a for the spring 21 on an upper part of the square cylindrical body, and a guide portion storage 3b configured to store a rear end portion of the guide portion 2a of the front housing 2 is provided further in the front as illustrated in FIGS. 7A to 7F.

An adapter locking strip 3c configured to be locked with a lug portion 3g and the LC type adapter 24 is formed so as to extend over the storage space 3a. Protruding from the cylindrical body forward is a plug frame fitting portion 3f configured to connect the plug frame 4 (see FIGS. 6A to 6F), and includes a front housing storage 3d formed on the outer periphery thereof.

Figure 11A:
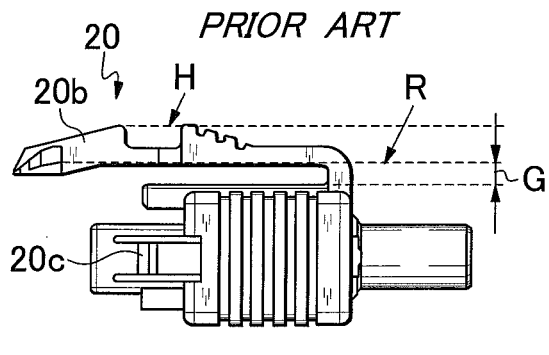
FIGS. 11A and 11B are a side view and a cross-sectional side view of a locking housing of the LC type plug with a shutter, respectively.
Figure 11B:
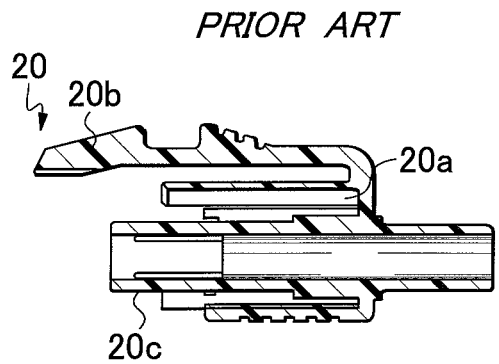
Figure 12:
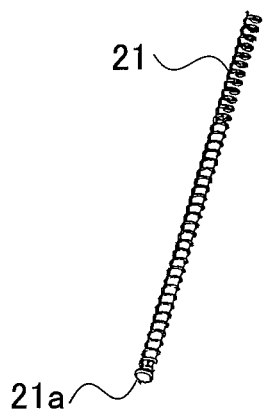
FIG. 12 is a perspective view illustrating a state of usage of a front housing biasing spring and a buckling preventing pin thereof in the LC type plug with a shutter.
Figure 13:
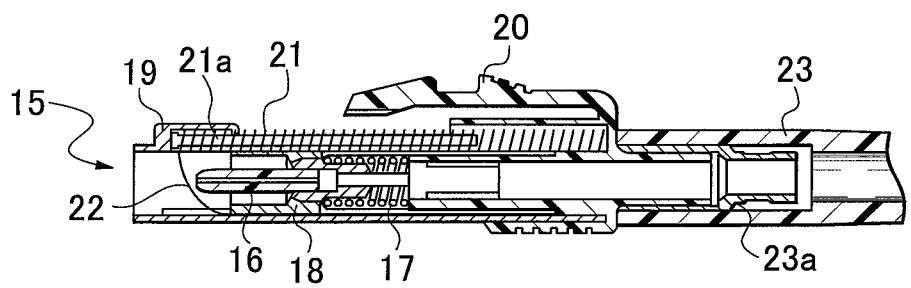
FIG. 13 is a cross-sectional side view illustrating the LC type plug with a shutter.

When the storage space 3a, the guide portion storage 3b, and the adapter locking strip 3c of the locking housing 3 are compared with a locking housing 20 of the prior art illustrated in FIGS. 11A and 11B, in the locking housing 20 of the prior art, there is no storage for storing the guide portion 19b of the front housing 19 when the guide portion 19b is extended.

In contrast, in the locking housing 3 of the invention, a latch height H and a locking position R of the adapter locking strip 3c are not changed, and only the shape of the latch on the lower side is changed to increase a thickness "a" on an upper surface in the direction of the height of the locking housing 3 and reduce a gap correspondingly in comparison with a prior art G, whereby the storage space 3a is provided and the guide portion storage 3b is formed on the front side.

The plug frame 4 is a square-shaped cylindrical body as illustrated in FIGS. 8A and 8B, is inserted and fitted into the plug frame fitting portion 3f of the locking housing 3, so that a locking hole 4b provided on the side wall is locked by a plug frame projecting portion 3h, and hence the plug frame 4 is prevented from coming apart forward.

An engaging portion 4a is formed in the interior of the cylindrical body of the plug frame 4, which serves as a partitioning wall of the ferrule 16 to be inserted from a rear opening and a retaining member against the movement in the forward direction. A shutter 22 illustrated in FIG. 8C is mounted on the opening 2d of the front housing 2 so as to be openable and closable, and is opened and closed in association with the movement of the ferrule 16 (see FIGS. 4 and 5). FIG. 8D illustrates a perspective view of a ferrule spring 17 and FIG. 8E illustrates a perspective view of the front housing spring 21. The spring 17 illustrated in FIG. 8D is stored in the plug frame 4, and biases the ferrule 16 forward (see FIG. 5). The spring 21 illustrated in FIG. 8E is stored in a space 2c on an upper part of the front housing 2 from the rear, and biases the front housing 2 forward (see FIG. 4).

In this manner, in the LC type plug 1 with a shutter of the invention, the storage space 2c of the front housing 2 and the storage space 3a for the rear portion of the spring provided in the locking housing 3 store the entire part of the spring 21, and as illustrated in FIG. 4, a joint portion side end portion (rear end portion) of the guide portion 2a is included in the guide portion storage 3b so as to overlap with each other on the joint portion sides thereof in the non-connected state. Therefore, the spring 21 is stored in the storage space completely so as not to be visible from the outside. Accordingly, corrosion of the spring 21 is prevented.

In addition, in the both storage spaces 2c and 3a, a pin 21a for preventing buckling of the elongated spring 21 is not necessary. In contrast, in an LC type plug 15 with a shutter of the prior art, the pin 21a for preventing buckling is necessary, and is an assembling component, so that the number of components is increased.

In this manner, the LC type plug 1 with a shutter of the invention may be assembled by storing the spring 21 in the storage space 2c of the front housing 2 and fitting the front housing 2 into the locking housing 3 without necessity of the buckling preventing pin 21a. Accordingly, the number of components is reduced, and the assembling costs are also reduced.

INDUSTRIAL APPLICABILITY

The LC type plug with a shutter of the invention may be applied widely to optical products (optical transceiver or the like) having the existing LC type adapter and the LC type opening shape.

What is claimed is:

1. An LC type plug with a shutter to be fitted into an LC type adapter, comprising:
   a plug frame configured to retain a ferrule;
   a square cylindrical front housing arranged so as to be slidable on the plug frame and including a shutter configured to open and close in association with a movement of the ferrule at a distal end side opening;
   a locking housing fixedly and integrally connected to the plug frame configured to be fitted into and be locked with the LC type adapter; and
   a spring provided between an upper part of the front housing and the locking housing configured to bias the front housing forward, wherein
   the front housing is provided with a front portion storage space configured to store a front portion of the spring, the locking housing is provided with a rear portion storage space configured to store a rear portion of the spring, a rear end side of the front portion storage space and a front end side of the rear portion storage space are formed so as to overlap with each other, and the spring is not exposed to an outside even in a non-connected state of the plug, and the entire part is stored in the both storage spaces.

2. The LC type plug with a shutter according to claim 1, wherein
   inner diameters of the both storage spaces are diameters close to an outer diameter of the spring such that the spring does not buckle even though the spring stored therein does not have a buckling preventing pin.

3. The LC type plug with a shutter according to claim 1, wherein the front portion storage space of the front housing fully encloses the front portion of the spring from the outside and the rear portion storage space of the locking housing fully encloses the rear portion of the spring from the outside.

4. An LC type plug with a shutter configured to be fitted into an LC type adapter, the LC type plug comprising:
   a plug frame configured to retain a ferrule;
   a front housing having a square cylindrical shape, the front housing being arranged so as to be slidable on the plug frame and including a shutter configured to open and close in association with a movement of the ferrule at a distal end side opening of the front housing;
   a locking housing being fixedly and integrally connected to the plug frame, the locking housing configured to be fitted into and locked with the LC type adapter; and
   a spring being provided between an upper part of the front housing and the locking housing, the spring configured to bias the front housing forward, wherein
   the front housing is provided with a front portion storage space configured to store a front portion of the spring, the locking housing is provided with a rear portion storage space configured to store a rear portion of the spring, a rear end side of the front portion storage space and a front end side of the rear portion storage space are formed so as to overlap with each other so that the spring is not exposed to an outside even in a non-connected state of the plug, and the spring is entirely stored in both of the front and rear storage spaces.

5. The LC type plug with a shutter according to claim 4, wherein
   inner diameters of both of the front and rear storage spaces are diameters close to an outer diameter of the spring such that the spring does not buckle even though the spring stored therein does not have a buckling preventing pin.

6. The LC type plug with a shutter according to claim 4, wherein the front portion storage space of the front housing fully encloses the front portion of the spring from the outside and the rear portion storage space of the locking housing fully encloses the rear portion of the spring from the outside.

7. An LC plug for fitting into an LC type adapter, the LC plug comprising:
   a plug frame configured to retain a ferrule;
   a front housing arranged so as to be slidable on the plug frame and including a shutter configured to open and close in association with a movement of the ferrule at a distal end side opening of the front housing;
   a locking housing fixedly and integrally connected to the plug frame and configured to be fitted into and locked with the LC adapter; and
   a spring provided between an upper part of the front housing and the locking housing and configured to bias the front housing away from the locking housing, wherein
   the front housing is provided with a front portion storage space configured to store a front portion of the spring, the locking housing is provided with a rear portion storage space configured to store a rear portion of the spring, a rear end side of the front portion storage space and a front end side of the rear portion storage space overlap with each other, the spring is not exposed to an outside even in a non-connected state of the LC plug, and the spring is entirely stored in the front and rear storage spaces.

8. The LC plug according to claim 7, wherein
   inner diameters of both the front and rear storage spaces are diameters close to an outer diameter of the spring such that the spring does not buckle even though the spring stored therein does not have a buckling preventing pin.

9. The LC plug according to claim 7, wherein the front portion storage space of the front housing fully encloses the front portion of the spring from the outside and the rear portion storage space of the locking housing fully encloses the rear portion of the spring from the outside.

* * * * *